United States Patent
Akiyama et al.

(10) Patent No.: US 8,133,313 B2
(45) Date of Patent: Mar. 13, 2012

(54) AQUEOUS INKJET INK AND INKJET RECORDING METHOD

(75) Inventors: Ryozo Akiyama, Mishima (JP); Hiroshi Kiyomoto, Hiratsuka (JP); Takaya Kitawaki, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/369,281

(22) Filed: Feb. 11, 2009

(65) Prior Publication Data

US 2009/0220694 A1 Sep. 3, 2009

Related U.S. Application Data

(60) Provisional application No. 61/032,368, filed on Feb. 28, 2008.

(51) Int. Cl.
*C09D 11/02* (2006.01)

(52) U.S. Cl. ............ 106/31.86; 106/31.65; 106/31.75; 106/31.89

(58) Field of Classification Search ............ 106/31.86, 106/31.75, 31.89, 31.65; 347/100
See application file for complete search history.

(56) References Cited

U.S. PATENT DOCUMENTS

| | | | |
|---|---|---|---|
| 5,156,675 A | 10/1992 | Breton et al. | |
| 5,952,414 A * | 9/1999 | Noguchi et al. | 524/377 |
| 6,048,914 A * | 4/2000 | Goto et al. | 106/31.89 |
| 6,939,400 B2 * | 9/2005 | Suzuki | 106/31.86 |
| 7,556,681 B2 * | 7/2009 | Sasaki et al. | 106/31.58 |
| 7,621,630 B2 * | 11/2009 | Ito et al. | 347/100 |
| 7,708,821 B2 * | 5/2010 | Kiyomoto et al. | 106/31.86 |
| 7,771,526 B2 * | 8/2010 | Yamamoto et al. | 106/31.86 |
| 2007/0040880 A1 * | 2/2007 | Jackson et al. | 106/31.86 |
| 2007/0078199 A1 * | 4/2007 | Winkler et al. | 523/160 |
| 2008/0132610 A1 * | 6/2008 | Yamashita | 524/56 |
| 2008/0233363 A1 * | 9/2008 | Goto | 428/195.1 |
| 2008/0282932 A1 | 11/2008 | Kiyomoto et al. | |
| 2009/0035468 A1 * | 2/2009 | Matsuyama et al. | 347/100 |
| 2009/0196995 A1 * | 8/2009 | Saito et al. | 427/256 |

FOREIGN PATENT DOCUMENTS

| | | |
|---|---|---|
| CN | 1504521 | 6/2004 |
| CN | 1865364 | 11/2006 |
| JP | 08-041396 | 2/1996 |
| JP | 09-111165 | 4/1997 |
| WO | WO 2008/023812 * | 2/2008 |

OTHER PUBLICATIONS

English translation of CN 1865364; Nov. 2006.*
Chinese Office Action dated Apr. 7, 2011 corresponding to U.S. Appl. No. 12/369,281, filed Feb. 11, 2009.

* cited by examiner

*Primary Examiner* — Helene Klemanski
(74) *Attorney, Agent, or Firm* — Turocy & Watson, LLP

(57) ABSTRACT

An embodiment of the invention is concerned with an aqueous inkjet ink containing an ink solvent containing water and a water-soluble organic solvent containing glycerin and triethylene glycol and a pigment dispersed in the ink solvent. The water-soluble organic solvent accounts for from 30 to 80% by weight of the ink solvent, a weight of the triethylene glycol is from 0.5 to 1.5 times the weight of the glycerin, and the pigment is blended in an amount of from 2 to 20% by weight of the total weight of the ink.

16 Claims, 1 Drawing Sheet

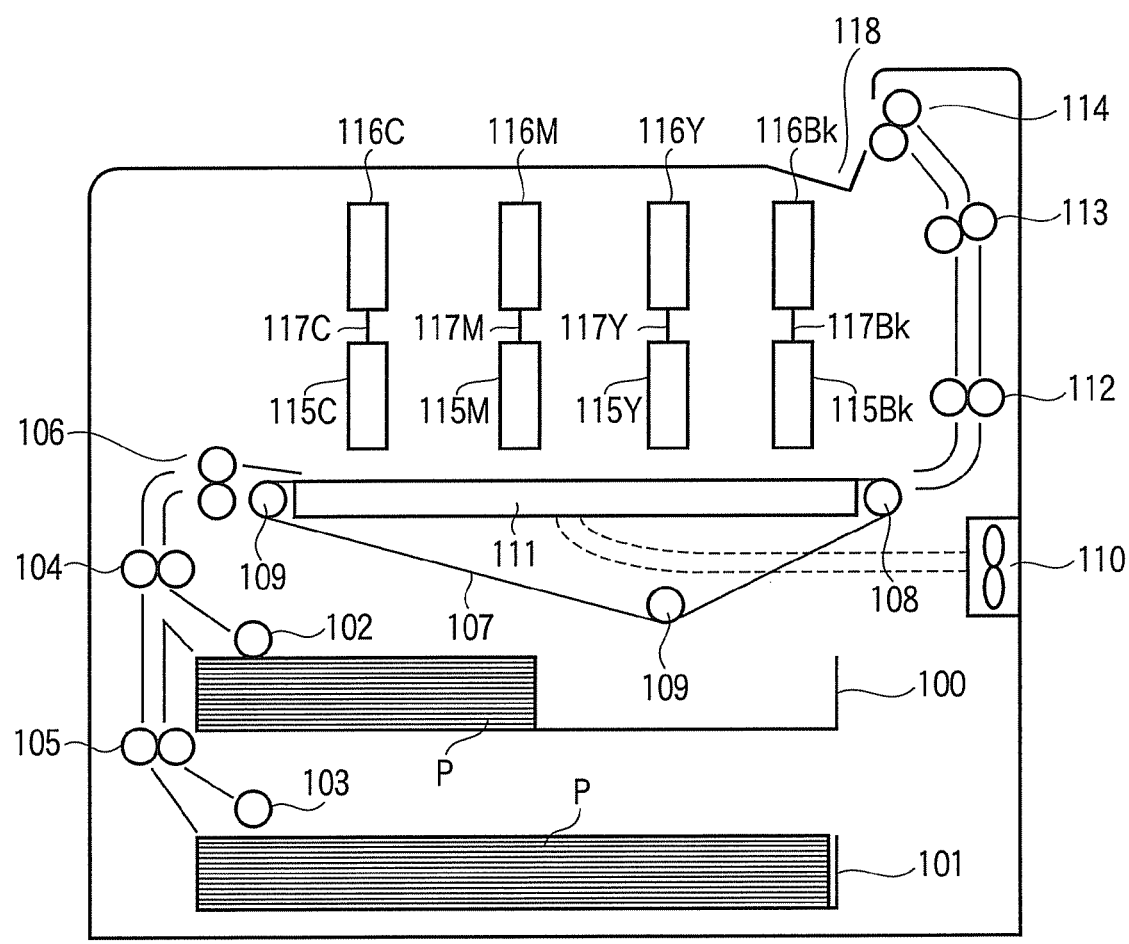
FIGURE

AQUEOUS INKJET INK AND INKJET RECORDING METHOD

CROSS-REFERENCE TO RELATED APPLICATION

This application is based upon and claims the benefit of priority from U.S. Provisional Application No. 61/032,368, filed on Feb. 28, 2008, the entire contents of which are incorporated herein by reference.

TECHNICAL FIELD

The present invention relates to an aqueous inkjet ink and an inkjet recording method.

BACKGROUND

In existing inks for inkjet recording, those of a water-soluble dye of every sort dissolved in an aqueous medium is generally used. Recently, an ink of a pigment dispersed in an aqueous medium is also proposed. This is because the ink using a pigment is excellent in water resistance and light fastness as compared with the ink using a water-soluble dye.

When a pigment is dispersed in a highly volatile solvent such as water to prepare an inkjet ink, a discharge performance from an inkjet head must be taken into consideration. When the solvent component volatilizes, a balance in a blending ratio between the pigment component and the solvent component is lost, and a concentration of the pigment in the ink in the vicinity of a nozzle extremely increases. As a result, a phenomenon such as an increase of viscosity of the ink or deposition of a coarse particle is caused. The nozzle is clogged, resulting in a lowering of the discharge performance. Specifically, a prescribed discharge volume is not obtainable, and the flying direction becomes inaccurate. According to circumstances, a misfiring nozzle appears, too.

Japanese Patent No. 3050049 proposes an ink containing, as a water-soluble solvent, glycerin and propylene glycol. Though the discharge performance is improved by the water-soluble solvent, there is still room for improvements in print quality regarding the print image density.

In the majority of existing pigment inks, by chiefly suppressing penetration properties, wetting of the ink against the paper surface is suppressed, thereby storing ink droplets in the vicinity of the paper surface to secure the print quality. Inks of such a kind are not always able to adapt to all kinds of paper, and a difference in bleeding due to a difference of the paper kind is large. In particular, a stable print quality is not obtainable in regenerated paper. The regenerated paper is manufactured by mixing an unspecified large number of kinds of papers. The difference in wetting characteristics of the ink against the kind of paper to be used affects the generation of bleeding. Also, according to existing pigment inks, it takes a long period of time to dry a printed area to be caused due to a composition thereof. In particular, in multicolor printing such as color printing, colors which are adjacent to each other cause color mixing. Furthermore, there is a problem that since the pigment remains on the surface of paper or the like, scratch resistance becomes worse.

For example, JP-A-9-111165 and U.S. Pat. No. 5,156,675 propose that a glycol ether based penetrating agent is blended in an ink, thereby enhancing penetration properties of the ink into paper. For the purpose of dispersing a pigment in an aqueous medium, a surfactant or a dispersant such as a polymer dispersant is contained in an existing pigment ink. There is a possibility that the glycol ether based penetrating agent impairs effects of the dispersant. There was involved a problem that when a large quantity of the glycol ether based penetrating agent is added, the dispersion stability of the pigment is lowered with a lapse of time.

It is the present situation that an ink which is an aqueous ink for inkjet recording which is adaptive to recording on plain paper and which is excellent in both quick drying properties and image quality of a printed matter and free from clogging by the ink in intermittent discharge and in which a pigment is stably dispersed even with a lapse of time is not obtained yet.

SUMMARY

An object of the invention is to provide an aqueous inkjet ink with excellent quick drying properties, which is capable of stably dispersing a pigment, keeping discharge performance and flying characteristics and forming an image with a high image density on plain paper.

Another object of the invention is to provide an inkjet recording method by forming an inkjet recording material with excellent quick drying properties on plain paper, thereby obtaining a high-quality image.

The invention is to provide an aqueous inkjet ink comprising:

an ink solvent containing water and a water-soluble organic solvent containing glycerin and triethylene glycol, the water-soluble organic solvent accounting for from 30 to 80% by weight of the ink solvent, and a weight of the triethylene glycol being from 0.5 to 1.5 times the weight of the glycerin; and a pigment dispersed in the ink solvent, the pigment being blended in an amount of from 2 to 20% by weight of the total weight of the ink.

Also, the invention is to provide a method for inkjet printing comprising:

jetting at least one kind of an ink composition onto plain paper from an inkjet head, thereby forming an image, the ink composition being the foregoing aqueous inkjet ink.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWING

The accompanying drawing, which is incorporated in and constitutes a part of the specification, illustrates embodiments of the invention, and together with the general description given above and the detailed description of the embodiments given below, serves to explain the principles of the invention.

The single FIGURE shows an example of an inkjet recording apparatus to which an embodiment of the invention is applied.

DETAILED DESCRIPTION

Embodiments of the invention are hereunder specifically described.

FIGURE is a cross-sectional view of a recording apparatus to be used in an inkjet recording method according to an embodiment of the invention. Paper cassettes 100 and 101 hold papers p having a different size from each other. A paper feed roller 102 or 103 takes out the paper p corresponding to the selected paper size from the paper cassette 100 or 101 and conveys it into conveyance roller pairs 104 and 105 and a resist roller pair 106.

A tension is given to a conveyance belt 107 by a drive roller 108 and two driven rollers 109. Holes are provided at prescribed intervals on the surface of the conveyance belt 107; and for the purpose of adsorbing the paper p onto the conveyance belt 107, a vacuum chamber 111 connected to a fan 110 is installed in the inside of the conveyance belt 107. Conveyance roller pairs 112, 113 and 114 are installed in the downstream of the paper conveyance direction of the conveyance belt 107.

In an upper part of the conveyance belt 107, four rows of inkjet heads for discharging an ink onto paper corresponding to an image data are arranged. An inkjet head 115C for discharging a cyan ink (C), an inkjet head 115M for discharging a magenta ink (M), an inkjet head 115Y for discharging a yellow ink (Y) and an inkjet head 115Bk for discharging a black ink (Bk) are arranged in this order from the upstream. Furthermore, each of these inkjet heads 115 is provided with a cyan (C) ink cartridge 116C, a magenta (M) ink cartridge 116M, a yellow (Y) ink cartridge 116Y and a black (Bk) ink cartridge 116Bk, respectively, each of which contains an ink of each color. Each of these cartridges is connected to tubes 117C, 117M, 117Y and 117Bk, respectively.

Image forming operations of the inkjet recording apparatus according to the invention are described.

First of all, image processing for recording by an image processor (not illustrated) is initiated, and image data for recording are transferred to the respective inkjet heads 115C, 115M, 115Y and 115Bk. Also, sheet of the paper p of a selected paper size is taken out from the paper cassette 100 or 101 by the paper feed roller 102 or 103 and conveyed to the conveyance roller pairs 104 and 105 and the resist roller pair 106. The resist roller pair 106 corrects a skew of the paper p and conducts the conveyance at a prescribed timing.

The vacuum chamber 111 draws air through the holes of the conveyance belt 107, and therefore, the paper p is conveyed in a state that it is adsorbed onto the conveyance belt 107 in a lower side of the inkjet head 115. Thus, the respective inkjet head 115 and the paper p can keep a fixed space from each other. The ink of each color is discharged from the respective inkjet heads 115C, 115M, 115Y and 115Bk in synchronism with the timing for conveying the paper p from the resist roller pair 106. Thus, a color image is formed at a desired position of the paper p. The paper p having an image formed thereon is outputted into a paper output tray 118 by the conveyance roller pairs 112, 113 and 114.

The aqueous inkjet ink according to an embodiment of the invention is contained in the respective ink cartridge.

The aqueous inkjet ink according to an embodiment of the invention contains an ink solvent containing water and an aqueous organic solvent and a pigment as a colorant. The composition of the ink solvent is specified as follows. The aqueous organic solvent contains glycerin and triethylene glycol and accounts for from 30 to 80% of the total weight of the ink solvent. A weight of triethylene glycol is from 0.5 to 1.5 times the weight of glycerin.

Furthermore, in the aqueous inkjet ink according to an embodiment of the invention, a concentration of the pigment is specified to be from 2 to 20% by weight of the total weight of the ink.

Since the aqueous inkjet ink according to an embodiment of the invention contains specified components in specified amounts, it has a stable discharge performance, is excellent in quick drying properties and is able to form a high-quality image on plain paper.

The water-soluble organic solvent in the ink solvent has an action to enhance an ink discharge performance and an image quality. All of glycerin and triethylene glycol have high moisture retention. In particular, though glycerin is excellent in moisture retention performance, it is not sufficient in penetration properties into paper. On the other hand, triethylene glycol is able to bear a role to control the degree of penetration of the ink solvent into paper.

The present inventors found that an optimal composition exists in the ink solvent containing glycerin, triethylene glycol and water. By using the ink solvent having a prescribed composition, an aqueous inkjet ink having a stable discharge performance in addition to a high moisture retention performance is obtainable. Since appropriate penetration properties are imparted, a print image density, namely an excellent image quality can be obtained by the aqueous inkjet ink according to an embodiment of the invention.

As described previously, the ink solvent in the aqueous inkjet ink according to an embodiment of the invention contains water and an aqueous organic solvent containing glycerin and triethylene glycol. The aqueous organic solvent accounts for from 30 to 80% of the total weight of the ink solvent. So far as the content of the aqueous organic solvent falls within this range, an appropriate moisture retention performance is obtainable. When the content of the aqueous organic solvent falls outside this range, the print quality is lowered. When the content of the aqueous organic solvent is less than 30% by weight, the clogging resistance is deteriorated; whereas when it exceeds 80% by weight, the quick drying properties are lowered. The content of the aqueous organic solvent is more preferably from 40 to 60% by weight of the total weight of the ink solvent.

The weight of triethylene glycol is specified to be from 0.5 to 1.5 times the weight of glycerin. When the weight of triethylene glycol is low, a penetration effect into paper is low so that the ink remains on the surface of paper, whereby penetration and drying become slow. In overlap printing of inks of a different color or printing a plural number of sheets of printed matter, the quality chiefly related to drying properties such as off-set of paper is lowered. On the other hand, when the weight of triethylene glycol exceeds 1.5 times the weight of glycerin, the penetration of the ink into paper becomes predominant. Following this, the penetration amount of the pigment component increases, resulting in a lowering of the print quality of the image density. It is more preferable that triethylene glycol is contained in a weight equal to that of glycerin.

Other component may be further blended in the ink solvent. For example, by blending urea, the discharge characteristic and storage stability are further enhanced; and when 3-methoxy-3-methyl-1-butanol is blended, the penetration properties are controlled, whereby the image quality can be much more enhanced.

So far as urea is contained in an amount of from about 3 to 10% of the total weight of the ink solvent, the subject effect is obtainable. It is desirable that the content of urea is controlled at about 50% by weight of triethylene glycol even at maximum. This is because when urea is excessively contained, during the decrease of the water content in the ink, crystallization is easily generated, thereby potentially impairing the discharge performance of the ink.

So far as 3-methoxy-3-methyl-1-butanol is contained in an amount of from about 1 to 10% by weight of the total weight of the ink solvent, the subject effect is exhibited.

In addition to the foregoing components, the following solvents may be blended in the ink solvent within the range where the characteristics of the aqueous inkjet ink according to an embodiment of the invention are not impaired.

Examples of such a solvent include a polyhydric alcohol such as ethylene glycol, diethylene glycol, polyethylene glycol, polypropylene glycol, 1,5-pentanediol, 1,6-hexanediol, 1,2,6-hexanetriol, 1,2,4-butanetriol, 1,2,3-butanetriol and petriol; a nitrogen-containing heterocyclic compound such as N-methyl-2-pyrrolidone, N-hydroxyethyl-2-pyrrolidone, 2-pyrrolidone, 1,3-dimethylimidazolidinone and ε-caprolactam; an amine such as monoethanolamine, diethanolamine, triethanolamine, monoethylamine, diethylamine and triethylamine; a sulfur-containing compound such as dimethyl sulfoxide, sulfolane and thiodiethanol; propylene carbonate; ethylene carbonate; and γ-butyrolactone.

The pigment is dispersed in the ink solvent as blended in a prescribed composition. The pigment is not particularly limited, and any of an inorganic pigment and an organic pigment may be used. Examples of the inorganic pigment include titanium oxide and iron oxide. Furthermore, carbon blacks which are manufactured by a publicly known method, for example, a contact method, a furnace method, a thermal method, etc. may be used.

Examples of the organic pigment which may be used include an azo pigment (for example, an azo lake pigment, an insoluble azo pigment, a condensed azo pigment, a chelate azo pigment, etc.), a polycyclic pigment (for example, a phthalocyanine pigment, a perylene pigment, a perinone pigment, an anthraquinone pigment, a quinacridone pigment, a dioxazine pigment, a thioindigo pigment, an isoindolinone pigment, a quinophthalone pigment, etc.), a dye chelate (for example, a basic dye type chelate, an acid dye type chelate, etc.), a nitro pigment, a nitroso pigment and Aniline Black.

Specific examples of the carbon black which is used as the black ink include No. 2300, No. 900, MCF88, No. 33, No. 40, No. 45, No. 52, MA7, MA8, MA100 and No. 2200B (all of which are manufactured by Mitsubishi Chemical Corporation); Raven 5750, Raven 5250, Raven 5000, Raven 3500, Raven 1255 and Raven 700 (all of which are manufactured by Columbian Chemicals Company); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all of which are manufactured by Cabot Corporation); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all of which are manufactured by Degussa AG).

Specific examples of the pigment which is used in the yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180 and C.I. Pigment Yellow 185.

Specific examples of the pigment which is used in the magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202 and C.I. Pigment Violet 19.

Specific examples of the pigment which is used in the cyan ink include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4 and C.I. Vat Blue 60.

Since an inkjet ink is intended, it is preferable that the pigment has an average particle size falling within the range of from about 1 to 300 nm. It is more preferable that the pigment has an average particle size falling within the range of from about 10 to 200 nm.

The foregoing pigment can be dispersed in the ink solvent by using a dispersant such as a surfactant or a water-soluble resin. Alternatively, the pigment may be used in a form of a self-dispersion pigment which is dispersible in the ink solvent without using a dispersant. The form of a self-dispersion pigment as referred to herein refers to a pigment which is dispersible in the ink solvent without using a dispersant and means a pigment in which a pigment is subjected to a surface treatment, thereby bonding at least one kind of a functional group of a carbonyl group, a carboxyl group, a hydroxyl group and a sulfone group or a salt thereof. Examples of the surface treatment include a vacuum plasma treatment, a diazo coupling treatment and an oxidation treatment. The self-dispersion pigment is obtained by grafting a functional group or a functional group-containing molecule on the surface of a pigment by such a surface treatment.

A concentration of the pigment is specified to be from 2 to 20% by weight of the total weight of the ink. When the amount of the pigment is too low, a required image density of the printed matter is not obtainable. On the other hand, when the amount of the pigment is too high, the preservability or discharge performance of the ink is lowered. When the concentration of the pigment falls within the foregoing range, the discharge performance of the ink is not lowered, and the storage stability is kept. The concentration of the pigment is more preferably in the range of from 3 to 10% by weight of the total weight of the ink.

The aqueous inkjet ink according to an embodiment of the invention is obtained by dispersing a prescribed concentration of the pigment in a prescribed ink solvent.

Since the aqueous inkjet ink according to an embodiment of the invention is used for inkjet recording, it is required to have an appropriate viscosity for discharge from a nozzle of a head in an inkjet printer. Specifically, a viscosity of the aqueous inkjet ink according to an embodiment of the invention at 25° C. is preferably from 5 to 50 mPa·s, and more preferably not more than 30 mPa·s. When the viscosity is not more than 30 mPa·s, it is possible to regulate the head control temperature in the discharge operation at a relatively low temperature.

A surfactant may be blended in the aqueous inkjet ink according to an embodiment of the invention. The surfactant acts as a surface tension modifier and is selected from an acetylene glycol based surfactant and a fluorine based surfactant.

Examples of the acetylene glycol based surfactant include 2,4,7,9-tetramethyl-5-decyne-4,7-diol, 3,6-dimethyl-4-octyne-3,6-diol and 3,5-dimethyl-1-hexyn-3-ol. Specifically, Surfynol 104, Surfynol 82, Surfynol 465, Surfynol 485 and Surfynol TG (all of which are manufactured by Air Products and Chemicals, Inc. (USA)) and the like may be used. In particular, Surfynol 465, Surfynol 104 and Surfynol TG are preferably used because they exhibit a favorable print quality.

Examples of the fluorine based surfactant include a perfluoroalkyl ethylene oxide adduct, a perfluoroalkylamine oxide, a perfluoroalkyl carboxylic acid salt and a perfluoroalkyl sulfonic acid. In particular, in view of the matter that a favorable print quality is obtainable, Megafac F-443, Megafac F-444, Megafac F-470 and Megafac F-494 (all of which are manufactured by DIC Corporation); Novec FC-430 and Novec FC-4430 (all of which are manufactured by 3M Corporation); and Surflon S-141, Surflon S-145, Surflon S-111N and Surflon S-113 (all of which are manufactured by Seimi Chemical Co., Ltd.) are preferable.

The foregoing acetylene glycol based surfactant or fluorine based surfactant may be used singly or in admixture of two or more kinds thereof. Of these, a fluorine based surfactant is preferable. This is because when used in a small amount, the fluorine based surfactant is able to reduce the surface tension and to enhance wettability between a discharge head and an ink and is also low in bleeding of a print image.

The surfactant is able to exhibit the effect so far as it is contained in an amount of from about 0.05 to 1.0% by weight of the ink solvent.

If desired, a salt or a nonionic surfactant may be blended. Examples of the salt include a polyoxyethylene alkyl ether acetic acid salt, a dodecylbenzene sulfonic acid salt, a laurylic acid salt and a polyoxyethylene alkyl ether sulfate. Examples of the nonionic surfactant include a polyoxyethylene alkyl ether, a polyoxyethylene alkyl ester, a polyoxyethylene sorbitan fatty acid ester, a polyoxyethylene alkylphenyl ether, polyoxyethylene alkylamine and a polyoxyethylene alkylamide.

A water-soluble resin may also be properly added in the aqueous inkjet ink according to an embodiment of the invention. The water-soluble resin regulates the viscosity of the ink and improves the print quality such as scratch resistance of a printed matter. For example, polyvinyl alcohol, hydroxypropyl cellulose, carboxymethyl cellulose, hydroxyethyl cellulose, methyl cellulose, a water-soluble acrylic resin, polyvinylpyrrolidone, gum arabic, dextrin, casein, pectin and the like may be used. Of these, a water-soluble acrylic resin is especially preferable. This is because the fixability to a recording medium such as paper is enhanced without impairing dispersibility of the pigment in the ink.

If desired, an additive such as a pH adjuster and an antiseptic or fungicide may be blended. Examples of the pH adjuster include potassium dihydrogenphosphate, disodium hydrogenphosphate and sodium hydroxide.

Examples of the antiseptic or fungicide which may be used include sodium benzoate, sodium pentachlorophenol, sodium 2-pyridinethiol-1-oxide, sodium sorbate, sodium dehydroacetate and 1,2-dibenzisothiazolin-3-one (for example, Proxel CRL, Proxel BDN, Proxel GXL, Proxel XL-2 and Proxel TN, all of which are manufactured by Imperial Chemical Industries Limited).

By blending such an additive, the print image quality or storage stability is further enhanced.

The invention is hereunder described in more detail with reference to the following specific examples.

First of all, an ink solvent and a pigment were blended in a formulation as shown in the following Table 1, thereby preparing an ink composition. In Table 1, the pigment was expressed in terms of % by weight of the solids content in the total weight of the ink. The remaining components are expressed in terms of % by weight relative to the total weight of the ink solvent. A self-dispersion type carbon black dispersion, CAB-JET-300 (manufactured by Cabot Corporation) was used as the pigment.

In preparing each ink composition, the respective components were mixed in a formulation as shown in Table 1 and stirred for one hour using a stirrer. Thereafter, the mixture was filtered through a 1-μm membrane filter, thereby obtaining a desired ink composition.

In all of the ink compositions, Proxel XL-2(S) was added as an antiseptic in an amount of about 0.2% by weight relative to the total weight of the ink.

TABLE 1

| No. | Pure water | Glycerin | TEG | PG | Pigment |
|---|---|---|---|---|---|
| 1 | 20 | 53 | 27 | — | 3 |
| 2 | 20 | 42 | 38 | — | 3 |
| 3 | 20 | 32 | 48 | — | 3 |
| 4 | 30 | 46 | 24 | — | 4 |
| 5 | 30 | 34 | 36 | — | 4 |
| 6 | 30 | 28 | 42 | — | 4 |
| 7 | 40 | 40 | 20 | — | 5 |
| 8 | 40 | 30 | 30 | — | 5 |
| 9 | 40 | 24 | 36 | — | 5 |
| 10 | 50 | 33 | 17 | — | 5 |
| 11 | 50 | 25 | 25 | — | 5 |
| 12 | 50 | 20 | 30 | — | 5 |
| 13 | 60 | 27 | 13 | — | 5 |
| 14 | 60 | 20 | 20 | — | 5 |
| 15 | 60 | 16 | 24 | — | 5 |
| 16 | 70 | 20 | 10 | — | 5 |
| 17 | 70 | 15 | 15 | — | 5 |
| 18 | 70 | 12 | 18 | — | 5 |
| 19 | 10 | 45 | 45 | — | 5 |
| 20 | 20 | 60 | 20 | — | 5 |
| 21 | 50 | 40 | 10 | — | 5 |
| 22 | 50 | 5 | 45 | — | 5 |
| 23 | 80 | 10 | 10 | — | 5 |
| 24 | 60 | 10 | — | 30 | 5 |
| 25 | 60 | 20 | — | 20 | 5 |
| 26 | 70 | 10 | — | 20 | 5 |

The obtained ink compositions were examined with respect to print quality, quick drying properties and clogging resistance. Five kinds of plain paper including Toshiba Copy Paper, Xerox 4024 Paper, Ricoh High-Grade Plain Paper (Type E), Tidal MP Paper and Neusiedler Paper were prepared; and an inkjet recording apparatus mounted with a piezo head, CB1 (manufactured by Toshiba Tec Corporation) was used as a recording apparatus.

(Print Quality)

Letters were printed on each of the foregoing five kinds of plain paper, thereby evaluating the print quality. The printed letters were visually assessed. Also, a print image density was examined using an X-Rite image density analyzer, and the print quality such as feathering and strike through was determined according to the following criteria. A solid image density of 1.2 is defined as a standard value of the print image density.

The case where in all of the five kinds of plain paper, neither a lowering of the print quality nor a lowering of the solid image density was observed is defined as "⊚". The case where in not more than two kinds of plain paper, a lowering in each of the print quality and the solid image density was observed is defined as "○"; and the case where in three or more kinds of plain paper, a lowering in each of the print quality and the solid image density was observed is defined as "Δ".

(Quick Drying Properties)

In evaluating the quick drying properties, Toshiba Copy Paper was used as plain paper. First of all, a region of 10 mm×10 mm of the plain paper was subjected to solid printing with 100 duty. After allowing the resulting plain paper to stand for a prescribed period of time, a new article of the same plain paper was laminated on the printed portion, and a weight of 300 g was placed thereon. After elapsing 10 seconds, the laminated plain paper was separated, thereby confirming whether or not the ink attached.

As the time after the solid printing until the lamination of a new article of plain paper, four kinds of a lapse of 5 seconds, a lapse of 10 seconds, a lapse of 30 seconds and a lapse of 60 seconds were adopted. In each of the cases, the degree of ink attachment was visually examined and determined according to the following criteria.

⊚: No attachment was observed after elapsing 5 seconds.
○: No attachment was observed after elapsing 10 seconds.
Δ: No attachment was observed after elapsing 30 seconds.

(Clogging Resistance)

Using each ink composition, printing was carried out by the foregoing inkjet recording apparatus. After printing, the nozzle was capped and allowed to stand in this state under an environment at 25° C. for one week. After allowing it to stand, a printing test was again carried out, thereby evaluating the clogging resistance in terms of discharge stability. The number of cleaning operations required until the discharge properties recovered was examined and determined according to the following criteria.

⊚: 0
○: Not more than 2
Δ: Not more than 5

The case where even one of the foregoing three evaluations of print quality, quick drying properties and clogging resistance is rated as "Δ" is defined as "NG".

The obtained results are shown in Table 2.

TABLE 2

| No. | Print quality | Quick Drying properties | Clogging resistance |
|---|---|---|---|
| 1 | ○ | ○ | ⊚ |
| 2 | ○ | ○ | ⊚ |
| 3 | ○ | ○ | ⊚ |
| 4 | ○ | ○ | ⊚ |
| 5 | ○ | ○ | ⊚ |
| 6 | ○ | ○ | ⊚ |
| 7 | ⊚ | ○ | ⊚ |
| 8 | ⊚ | ○ | ⊚ |
| 9 | ⊚ | ○ | ⊚ |
| 10 | ⊚ | ⊚ | ⊚ |
| 11 | ⊚ | ⊚ | ⊚ |
| 12 | ⊚ | ⊚ | ⊚ |
| 13 | ⊚ | ⊚ | ⊚ |
| 14 | ⊚ | ⊚ | ⊚ |
| 15 | ○ | ⊚ | ⊚ |
| 16 | ○ | ⊚ | ○ |
| 17 | ○ | ⊚ | ○ |
| 18 | ○ | ⊚ | ○ |
| 19 | Δ | Δ | ⊚ |
| 20 | Δ | Δ | ⊚ |
| 21 | Δ | ○ | ⊚ |
| 22 | ○ | ○ | Δ |
| 23 | Δ | ○ | Δ |
| 24 | ○ | ○ | Δ |
| 25 | ○ | Δ | ○ |
| 26 | ○ | ○ | Δ |

As shown in the foregoing Table 2, in all of the ink compositions Nos. 1 to 18, favorable results are obtained with respect to the print quality, quick drying properties and clogging resistance. As shown in Nos. 7 to 15, in the case where the water-soluble organic solvent accounts for from 40 to 60% by weight of the ink solvent, two or more items of the evaluation results are rated as "⊚", and the excellent performance could be obtained.

When the content of the water-soluble organic solvent falls outside the prescribed range, the characteristics are deteriorated as shown in Nos. 19 and 23. When the proportion of triethylene glycol and glycerin falls outside the prescribed range, the characteristics are deteriorated, too as shown in Nos. 21 and 22.

It is evident from Nos. 24 to 26 that when triethylene glycol is replaced by propylene glycol, the desired characteristics are not obtainable.

Subsequently, ink compositions Nos. 27 to 30 were prepared by blending an additive in a formulation as shown in the following Table 3 in the same ink composition as in No. 11. In the following Table 3, Solfit (manufactured by Kuraray Co., Ltd.) is 3-methoxy-3-methyl-1-butanol. The numerical values in Table 3 are all % by weight relative to the total weight of the ink solvent.

TABLE 3

| No. | Urea | Solfit | Surflon S111N | Surfynol 465 |
|---|---|---|---|---|
| 27 | 10 | — | — | — |
| 28 | — | 5 | — | — |
| 29 | — | — | 0.2 | — |
| 30 | — | — | — | 0.2 |

The obtained ink compositions were examined with respect to print quality, quick drying properties and clogging resistance in the same manners as described above. The results are summarized in the following Table 4.

TABLE 4

| No. | Print quality | Quick drying properties | Clogging resistance |
|---|---|---|---|
| 27 | ○ | ⊚ | ⊚ |
| 28 | ⊚ | ⊚ | ○ |
| 29 | ⊚ | ○ | ⊚ |
| 30 | ○ | ⊚ | ⊚ |

As shown in Table 4, in all of these ink compositions, two or more items of the evaluations are rated as "⊚", and it is noted that excellent ink characteristics are revealed.

The aqueous inkjet ink according to an embodiment of the invention has excellent quick drying properties and is capable of stably dispersing a pigment, keeping discharge performance and flying characteristics and forming an image with a high image density on plain paper.

Also, according to the inkjet recording method of an embodiment of the invention, an inkjet recording material with excellent quick drying properties is formed on plain paper, thereby obtaining a high-quality image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An aqueous inkjet ink, comprising:
an ink solvent containing water and a water-soluble organic solvent containing glycerin and triethylene glycol, the water-soluble organic solvent accounting for from 30 to

80% by weight of the ink solvent, and a weight of the triethylene glycol being from 0.5 to 1.5 times the weight of the glycerin;

a pigment dispersed in the ink solvent, the pigment being blended in an amount of from 2 to 20% by weight of the total weight of the ink; and urea; and 3-methoxy-3-methyl-1-butanol.

2. The ink according to claim 1, wherein the water-soluble organic solvent accounts for from 40 to 60% by weight of the ink solvent.

3. The ink according to claim 1, wherein the pigment is contained in an amount of from 3 to 10% by weight of the total weight of the ink.

4. The ink according to claim 1, further comprising at least one selected from the group consisting of an acetylene glycol based surfactant and a fluorine based surfactant.

5. The ink according to claim 1, further comprising at least one selected from the group consisting of a polyhydric alcohol, a nitrogen-containing heterocyclic compound, an amine, a sulfur-containing compound, propylene carbonate, ethylene carbonate and γ-butyrolactone.

6. The ink according to claim 1, wherein the pigment is a particle having an average particle size of from 10 to 200 nm.

7. The ink according to claim 1, wherein a viscosity of the ink is from 5 to 50 mPas at 25° C.

8. An aqueous inkjet ink, comprising:

an ink solvent containing water and a water-soluble organic solvent containing glycerin and triethylene glycol, the water accounting for from 20 to 70% by weight of the ink solvent, and a weight of the triethylene glycol being from 0.5 to 1.5 times the weight of the glycerin;

a pigment dispersed in the ink solvent, the pigment being blended in an amount of from 2 to 20% by weight of the total weight of the ink;

urea; and 3-methoxy-3methyl-1-butanol.

9. The ink according to claim 8, wherein the water accounts for from 40 to 60% by weight of the ink solvent.

10. The ink according to claim 8, wherein the pigment is contained in an amount of from 3 to 10% by weight of the total weight of the ink.

11. The ink according to claim 8, further comprising at least one selected from the group consisting of an acetylene glycol based surfactant and a fluorine based surfactant.

12. The ink according to claim 8, wherein the pigment is a particle having an average particle size of from 10 to 200 nm.

13. The ink according to claim 8, wherein a viscosity of the ink is from 5 to 50 mPas at 25° C.

14. A method for inkjet printing comprising:

jetting at least one kind of an ink composition onto plain paper from an inkjet head, thereby forming an image, the ink composition being the aqueous inkjet ink according to claim 1.

15. The method according to claim 14, wherein the formation of an image is carried out using one kind of an ink composition.

16. The method according to claim 14, wherein the formation of the image is carried out using two or more kinds of ink compositions having a different color from each other.

\* \* \* \* \*